United States Patent Office 3,196,323
Patented July 20, 1965

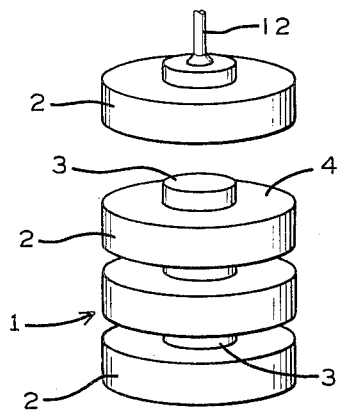
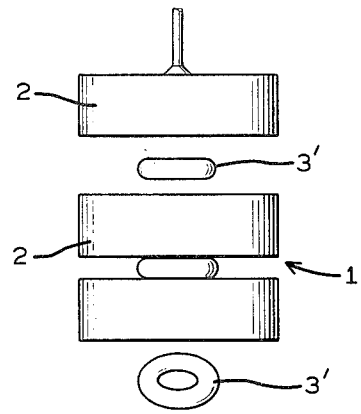
FIG. 1    FIG. 2
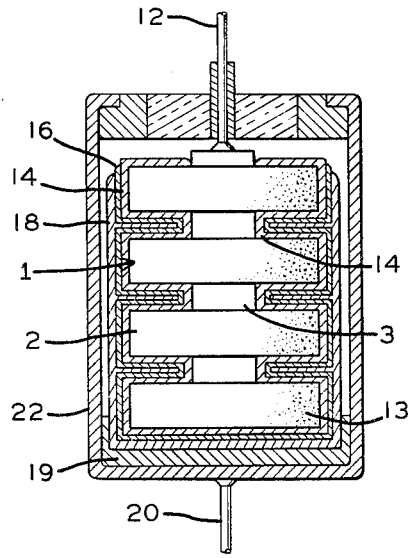
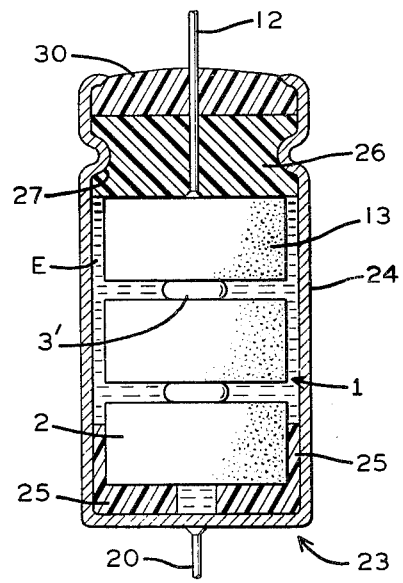
FIG. 3    FIG. 4
DONALD G. ROGERS
DOMINIC J. ZEPPIERI
*INVENTORS.*
BY *Connolly and Hutz*
THEIR ATTORNEYS

3,196,323
ELECTRIC CAPACITOR WITH POROUS ELECTRODE AND METHOD FOR MAKING SAME
Donald G. Rogers, Pownal, Vt., and Dominic J. Zeppieri, Adams, Mass., assignors to Sprague Electric Company, North Adams, Mass., a corporation of Massachusetts
Filed Feb. 29, 1960, Ser. No. 11,914
9 Claims. (Cl. 317—230)

The present invention relates to electric capacitors. More particularly, the invention relates to a new and novel type anode of the sintered metal pellet type for use in both solid and wet electrolyte capacitors. In addition, the invention relates to a method for producing the anodes.

Recently, a dire need has arisen for larger porous metal pellet-type anodes for use in capacitors whereby the capacitance may be increased.

One of the difficulties encountered when attempting to increase the size of pellet anodes for use in solid and wet electrolyte capacitors has been the disadvantage that electrolyte impregnation of the anode becomes reduced as the size of the anode increases. In addition, a plurality of different size dies or molds must be produced and maintained in order to provide the desired increased size of the anodes; to provide, in turn, the desired capacitance.

It is therefore an object of the present invention to provide new and novel porous metal pellet-type anodes of increased size for both solid and wet electrolyte capacitors whereby the capacitance is increased.

Another object of the invention is to provide new and novel capacitor anodes of the above type which are easily and highly satisfactorily impregnated with a suitable electrolyte.

Still another object of the invention is to provide new and novel anodes of the above type wherein the size of the anodes, and therefore the capacity, may be adjusted by merely stacking together a desired number of anode units.

A still further object of the invention is to provide new and novel anodes of the above type wherein the plurality of units that are joined to obtain a desired capacitance rating are obtained from a very few different unit sizes.

A further object of the present invention is to provide a new and novel method for producing porous metal pellet-type anodes for use in capacitors.

Other objects and advantages of the present invention will become apparent from a study of the following description and drawing wherein:

FIG. 1 is a perspective of the anode of the present invention with one of the units making up the anode being separated from the assembly;

FIG. 2 is an elevation of an embodiment of the anode assembly of FIG. 1, showing the anode in partially disassembled form;

FIG. 3 is a partial section of a solid electrolyte capacitor showing the anode of the present invention in position within the capacitor casing; and FIG. 4 is a partial section of a wet electrolyte capacitor showing the anode of the present invention in position within the capacitor casing.

Generally, the anode of the present invention is formed of a plurality of discs of pressed metal particles, preferably tantalum particles. In the preferred embodiment of this invention the desired capacitance rating is obtained by utilizing discs of equal size, so as to reduce to a minimum the number of disc sizes that need be stocked. However, it should be understood that it is within the scope of this invention to employ discs of assorted sizes to arrive at an anode of a particular capacitance. Generally the discs should be of the same diameter, and only the thickness permitted to vary. Even in the lesser embodiment of assembling an anode from discs of different sizes, it has been found that only two or three disc sizes are needed to produce exactly any given capacitance rating. These discs are partially sintered, stacked, and then welded together through a spacing means provided between adjacent discs. A lead-wire is welded to the exposed face of one of the end discs. While the number of discs that can be joined into a stacked anode according to this invention may vary widely with design conditions, it has been found that the usual commercial range of capacitance values can best be obtained within available space limitations by stacking from two to eight discs.

In order to concentrate the welding heat and also to provide a spacing means between adjacent discs, according to one embodiment of the invention, the discs are provided with a raised center bead on one face of each disc which is welded to the flat surface lying opposite the raised surface of an adjacent disc. The spacing between adjacent discs that is obtained according to this invention serves to expose a large area of the anode assembly so as to ensure better formation and impregnation than could be attained with a massive anode of the same capacitance rating. After the disc stack has been assembled and welded, the sintering operation is carried to completion, thereby providing an effective clean-up operation to delete impurities resulting from the welding operation.

Another manner by which the welding facility and disc spacing may be achieved is to separate adjacent discs in stacked form with rings of the same material of which the discs are formed which are subsequently welded in position by the welding operation, so as to join the discs into a single unit.

As seen in FIG. 1, the anode generally designated as 1 consists of a series of individual discs 2, each of which has an integral raised center portion or bead 3 on one of its surfaces 4. The bead 3 provides the dual function of serving as a spacing member and for facilitating welding together the discs. As set forth above, each disc is preferably of the same physical size. The discs 2 are assembled or stacked as a unit as shown in FIG. 1 with the bead 3 of each disc lying against the flat side or under surface (as shown) of an adjacent disc.

Initially, the discs 2 are merely discs of pressed metal particles. The discs are pressed to about one-half the density of tantalum metal by controlling the length (height) of the disc and the amount of powder to be utilized; the disc diameter and the pressure being constants that are dependent on the apparatus. After the discs have been partially (roughly 50%) sintered at about 2,000° C. for approximately 30 minutes, they are assembled in stacked form as explained above and welded together. This initial sintering is sufficient to establish rigidity and cohesiveness in the discs so as to greatly reduce the danger of breakage in subsequent handling operations. The beads 3 of the discs 2 are welded to the flat surface or under surface of adjacent discs. An anode lead wire 12 is welded to the exposed surface of one of the end discs. After the disc stack has been processed as above, the sintering operation is completed at about 2,000° C. for approximately another 30 minutes, thereby providing an effective clean-up operation to remove impurities resulting from the welding operation. Although the particular extent of the initial sintering that is disclosed herein is not critical, it is necessary that substantial sintering be obtained to permit normal handling; and that this substantial sintering be less than complete, so as to facilitate the clean-up function of the second sintering step.

As seen in FIG. 2, small rings 3′ may be inserted between the discs 2 to provide the spacing and welding connection between the discs instead of the raised portion or bead 3. The rings 3′ are preferably of the same metal as the particles making up the discs 2. However, it is within the concept of this invention to employ rings of a highly compatible metal, e.g., niobium rings with tantalum discs. The anode is assembled and processed in the manner set forth above.

Whether the construction of FIG. 1 or the construction of FIG. 2 is utilized, it is an essential feature of this invention that the stack of discs be united into a monolithic anode wherein the discs are in ohmic contact with one another. That is, the particles of each disc must not only be in intimate electrical contact, but must also be in intimate electrical contact with the particles of all the other discs, so as to produce a unitary low resistance structure.

Each disc 2 consists of sintered particles of a valve-metal such as tantalum, aluminum, zirconium, columbium, and mixtures thereof which are coalesced at their points of contact so as to form pores. The sintered disc of valve metal, which for purpose of this discussion shall be considered a sintered tantalum pellet, as this is the preferred structure, is provided with a thin oxide coating of tantalum oxide which serves as the dielectric layer of the capacitor structure.

The preferred anode structure of this invention is a tantalum pellet made from pressed and sintered metallic tantalum powder. Such a sintered pellet per se is well-known to the art and can be produced not only from sintered metallic powder, but also from tantalum coated ceramic powder as taught by applicant in his copending application Serial No. 517,135, filed June 22, 1955 (now abandoned). The sintered tantalum pellet can be spot welded or otherwise electrically jointed by suitable connecting means to an anode lead-wire.

As mentioned above, the anode 1 can be used in both the solid (semiconductor) and wet electrolyte capacitors. When used with the solid type capacitors shown in FIG. 3, the dielectric oxide coated pores of the tantalum discs 2 are filled with, and surrounded by a layer 14 of a solid electrolyte, preferably manganese dioxide. This manganese dioxide electrolyte is contiguous with the tantalum oxide dielectric coating mentioned above.

To prepare a solid state electrolytic device in accordance with this invention the tantalum anode discs 2 after being welded together are of 39% porosity (about 35 to 45% porosity is found to be most suitable). The porosity is determined by dividing the weight of the discs by the product of the density of the metal by the volume of the discs. The formation of the dielectric oxide layer and the establishment of the semiconductive layer are preferably achieved in accordance with the process described in British patent specification 747,051 published March 28, 1956.

Disposed upon the surface of the manganese dioxide electrolyte layer 14 is a layer of carbon particles 16, and an outer electrode 18 usually of a metal such as sprayed copper. Further suitable cathode metals include zinc, tin, silver and gold. The carbon particle layer 16 and the cathode layer 18 are also preferably achieved in accordance with Br. 747,051.

It is necessary that the solid electrolyte layer 14 be positioned between the anode 1 and the cathode 18 and/or the contact layer 16 everywhere so as to prevent shorting of the device. The manganese dioxide functioning as the solid electrolyte is believed to be an "n" type semiconductor having a resistivity at 20° C. of from about 1.0 to about 1.5 ohm centimeters.

The fabricated solid electrolyte unit is preferably maintained in an atmosphere of about 0% relative humidity prior to encapsulation or encasement. This encapsulation may be either a molded or cast resin, e.g., silica filled epoxy or mineral filled phenol formaldehyde; or for extremely high temperature operations, of a ceramic nature, e.g., vitreous enamel. However, the preferred encasement for the solid capacitance section is in a hermetically sealed can having a glass-to-metal endseal, as shown at 22 in FIG. 3, with or without potting in a hydrophobic material such as wax. The solid electrolyte capacitance section is secured in electrical contact with container 22 by means of solder 19. The anode lead-wire 12 extends through the eyelet in the glass-to-metal endseal in electrical isolation from container 22; whereas cathode lead-wire 20 is joined directly to container 22.

The versatility of the sintered anode of this invention is exhibited by the use of anode 1 (either FIG. 1 or 2) with its dielectric oxide coated pores in the wet electrolyte capacitor 23 shown in FIG. 4. The capacitor 23 is preferably provided with an outer tubular can 24 of silver. The can 24 contains a relatively inert insulating bottom spacer 25 which assists in the mounting of the anode 1. The spacer 25, shown in the form of a cup, is preferably of resilient material to coact with endseal 26 to secure anode 1 against movement. For example, spacer 25 may be of a suitable elastomer such as Kel–F elastomer (a copolymer of trifluorochloroethylene and vinylidene fluoride) or Hypalon (a sulfurized polyethylene polymer). The open end of the can 24 is closed by a relatively rigid resin plug 26 (e.g., Teflon) which has a short cylindrical shape with flat horizontal upper and lower surfaces. A groove 27 is cut around in the middle of the plug 26 extending inwardly of the plug appreciably from the vertical lateral surface. In the assembly of the capacitor 23, the can is filled with the suitable electrolyte E, e.g., lithium chloride or sulfuric acid, and the anode 1 and plug 26 are positioned in the can 24. The spacer 25 has resiliency which assists in the coaction of the spacer and the plug 26 in accommodating the possible variations in length of the anode, and in holding the anode against rotation.

After the plug 26 is positioned in the can 24, a wafer gasket 30 of resilient material is superimposed on the plug 26 in the can 24. The plug 26 and the gasket 30 are then secured in the can 24 by a forming of the can wall. The upper rim of the can 24 is spun over on the gasket 30 to hold the basket and the plug in the can. Then the side wall of the can is rolled into the formed groove 27 in plug 26. The lead-wire 12 from anode 1 extends through plug 26 and gasket 30 of the capacitor 23.

The specific capacitor structure shown in FIGS. 3 and 4 (other than the anode) is only descriptive of the many capacitor structures which may utilize the anode of the present invention.

The spacing of the discs 2 of the anode 1 in the specific manner described ensures better impregnation of the discs, as described above, by both the solid and wet electrolytes. Also the use of individual discs 2 provides the ability to easily produce anodes of any desired capacitance by stacking together the required number of discs, each of which has a known capacitance.

Various other modifications and substitutions may be made in some of the elements of the above capacitors without departing from the spirit of the invention.

What is claimed is:

1. A method of producing a metal pellet-type porous anode comprising the steps of pressing metal particles to form a plurality of individual and separate porous valve-metal discs, partially sintering the discs, stacking the discs in contiguous manner, providing valve-metal connecting means between each disc, welding the discs together through said connecting means, welding an anode lead-wire to an end of the stacked discs, and completing the sintering of the discs.

2. The method of producing metal pellet-type porous anodes according to claim 1 wherein the discs are connected through integral raised beads disposed centrally on one of the flat surfaces of each disc.

3. The method of producing metal pellet-type porous anodes according to claim 1 wherein the discs are connected together by individual and separate small ring-shaped metallic members disposed between adjacent discs.

4. The method of producing metal pellet-type porous anodes according to claim 1 wherein the metal particles are tantalum particles.

5. The method of producing a metal pellet-type porous anode according to claim 1 wherein a dielectric oxide layer is formed over the surfaces of the pores and wherein the porous anode pellet is impregnated with a solid electrolyte material which lies in contact with said oxide coating.

6. The method of producing an anode according to claim 1 wherein the partial sintering and completion sintering are each carried out at a temperature of approximately 2,000° C. for approximately thirty minutes.

7. The method of producing metal pellet-type porous anodes according to claim 1 wherein the step of providing valve-metal connecting means consists in providing raised beads between adjacent discs.

8. A method of producing a metal pellet-type porous anode comprising the steps of pressing metal particles to form a plurality of individual and separate valve-metal discs of the same valve-metal, partially sintering the discs, stacking the discs in contiguous manner, providing connecting means between each disc, welding the discs together through said connecting means, welding an anode lead-wire to an end of the stacked discs, and completing the sintering of the discs.

9. In an electric capacitor, an anode comprising a plurality of welded together spaced apart individual and separate sintered porous valve-metal discs having the same composition, and having an oxide dielectric coating over the pore surfaces, said discs being welded together through separate and individual small ring-shaped spacer members between adjacent discs, said spacer members being formed of the same material as the discs, and an anode lead welded to one of the end discs.

References Cited by the Examiner
UNITED STATES PATENTS

| | | | |
|---|---|---|---|
| 554,043 | 2/96 | Williams | 317—230 |
| 1,958,682 | 5/34 | Sprague | 317—230 |
| 1,969,396 | 8/34 | Duftschmid | 75—208 |
| 2,299,228 | 10/42 | Gray et al. | 317—230 |
| 2,359,970 | 10/44 | Clark | 317—230 |
| 2,406,345 | 8/46 | Brennan | 317—230 |
| 3,036,249 | 5/62 | Hall | 317—230 |

DAVID J. GALVIN, *Primary Examiner.*

LLOYD McCOLLUM, JAMES D. KALLAM,
*Examiners.*